(12) United States Patent
Hickling

(10) Patent No.: US 7,054,226 B1
(45) Date of Patent: May 30, 2006

(54) METHOD AND APPARATUS FOR ECHOLOCATION

(76) Inventor: Robert Hickling, 8306 Huntington Rd., Huntington Woods, MI (US) 48070

( * ) Notice: Subject to any disclaimer, the term of this patent is extended or adjusted under 35 U.S.C. 154(b) by 0 days.

(21) Appl. No.: 10/842,880

(22) Filed: May 10, 2004

Related U.S. Application Data

(63) Continuation-in-part of application No. 10/396,541, filed on Mar. 25, 2003, and a continuation-in-part of application No. 10/658,076, filed on Sep. 9, 2003, now Pat. No. 6,862,252, and a continuation-in-part of application No. 10/746,763, filed on Dec. 26, 2003.

(51) Int. Cl.
*G01S 15/00* (2006.01)

(52) U.S. Cl. .......................................... 367/87; 367/99

(58) Field of Classification Search ............... 367/87, 367/88, 99
See application file for complete search history.

(56) References Cited

U.S. PATENT DOCUMENTS

| | | | |
|---|---|---|---|
| 4,279,019 A | | 7/1981 | Heyser |
| 4,955,001 A | * | 9/1990 | Guigne ........................ 367/129 |
| 5,107,467 A | * | 4/1992 | Jorgensen et al. ............. 367/99 |
| 6,130,641 A | * | 10/2000 | Kraeutner et al. ........... 342/179 |

OTHER PUBLICATIONS

SUzuki et al., "Performance evaluation of a three dimensional intensity probe", J. Acoust. Soc. Jpn. (E), 16, 4 (1995).*
U.S. Appl. No. 10/396,541, Robert Hickling.
U.S. Appl. No. 10/658,076, Robert Hickling.
U.S. Appl. No. 10/746,763, Robert Hickling.
Griffin, "Listening in the Dark The Acoustic Orientation of Bats & Men" Yale U Press, 1958.
Simmons, "Bats and Echolocation", Chapt.151, 1819-1822 in Encyclopedia of Acoustics (Crocker, ed), John Wiley &Sons, 1997.

(Continued)

*Primary Examiner*—Ian J. Lobo
(74) *Attorney, Agent, or Firm*—Reising Ethington Barnes Kisselle P.C.

(57) ABSTRACT

Method and apparatus for application of echolocation to robot guidance and assisting the blind. The method is based on the echolocation of bats. It combines a source of pulsed ultrasound (100) with a recently-developed acoustic vector probe (AVP) (200) into an echolocation instrument (1000), together with a data-acquisition system (300), a digital signal processor (400) and an output device (500). The source emits pulses of ultrasound of about 35 kHz over a beam angle of approximately 100 degrees and the AVP detects backscattered pulses from a discrete distribution of acoustic highlights on surrounding objects. The ultrasonic sound pressures of the backscattered pulses are heterodyned down to lower frequencies so that the signal processor can make an accurate determination of the sound-intensity vector for each pulse. The sound-intensity vector points in the direction of the highlight from which the backscattered pulse originates while the round-trip time of flight of the pulse determines the distance to the highlight. In this way the positions of the highlights on surrounding objects can be determined. The distribution of such highlights changes when the echolocation instrument moves relative to surrounding objects, generating a sequence of highlight distributions that can be stored in the memory of the processor and combined to provide a more complete representation of surrounding objects.

5 Claims, 2 Drawing Sheets

OTHER PUBLICATIONS

Hartley & Suthers, "The sound emission pattern of the echolocating bat, *Eptesicus fuscus*" J. Acoust Soc Amer 85,1348-1351, 1989.

Simmons, "Directionality of biosonar broadcasts and reception by the ears" Tutorial Lecture, Acoust. Soc. Amer. Jun., 2002.

Lee, "The Map-Building and Exploration Strategies of a Simple Sonar-Equipped Mobile Robot", Camb.U. Press, 1996.

Kay "Auditory perception of objects by blind personsusing a bioacoustic high-resolution air sonar", J. Acoust. Soc. Amer.107(6) 3266-3276, 2000.

Hickling & Means, "Scattering of frequency-modulated pulses by spherical elastic shells in water", J. Acoust Soc. Amer.44,5, 1246-1252, 1968.

Hickling, "Analysis of echoes from a solid elastic sphere in water". J. Acoust. Soc. Amer.34, 1582-1592, 1962.

Rutledge, "The Electronics of Radio", Camb. U Press, 1999.

\* cited by examiner

METHOD AND APPARATUS FOR ECHOLOCATION

THIS APPLICATION IS A CONTINUATION-IN-PART OF US patent application ENTITLED "ACOUSTIC MEASUREMENT METHOD AND APPARATUS" Ser. No. 10/396,541, FILED 2003, MAR. 25, ALSO OF CONTINUATION-IN-PART ENTITLED "METHOD AND APPARATUS FOR ACOUSTIC DETECTION OF BURIED OBJECTS" Ser. No. 10/658,076, FILED 2003 SEP. 9 now U.S. Pat. No. 6,862,252, AND ALSO OF CONTINUATION-IN-PART ENTITLED "SOUND SOURCE LOCATION AND QUANTIFICATION USING ARRAYS OF VECTOR PROBES" Ser. No. 10/746,763, FILED 2003, DEC. 26, ALL THREE SUBMITTED BY ROBERT HICKLING, THE PRESENT INVENTOR.

TECHNICAL FIELD

This invention relates to an echolocation instrument for robot guidance and for aiding the blind that combines a recently developed acoustic vector probe (AVP) and a source of pulsed ultrasound.

BACKGROUND OF THE INVENTION

Acoustic Vector Probes

Recently a patent application was filed for a new acoustic instrument, the acoustic vector probe (AVP).

1. R. Hickling 2003, "Acoustic Measurement Method and Apparatus", patent application to the United States Patent and Trademark Office, Ser. No. 10/396,541, Filing Date Mar. 25, 2003.

The technical information contained in this application is hereby incorporated herein by reference.

An AVP consists of a tetrahedral arrangement of four small microphones less than 6 mm in size that simultaneously measures at a point in air the three fundamental quantities of acoustics, namely the sound-intensity and sound-velocity vectors, and sound pressure. Sound intensity is the time average of sound power flow per unit area. The time dependence of sound intensity is determined by taking a series of averages over short intervals. AVPs are more accurate, more compact and less expensive than previous instruments for measuring sound intensity. A calibration procedure described by Hickling (Ref. 1) ensures the probe is accurate and omnidirectional.

The sound-intensity vector determines the direction of a sound source. Because it is expressed as a fast Fourier transform (FFT), it also provides information about the frequency characteristics of the source, enabling the AVP to distinguish one source from another. Sources can also be distinguished by how they occur in time.

The microphones that are used in AVPs can be of the electret type such as the Knowles FG series or the Primo EM123 which respond to ultrasonic frequencies up to about 40 kHz. Also the frequency range of the calibrating microphone, such as the Bruel and Kjaer 4135, extends to about 100 kHz. However measurement with an AVP is presently limited to the audible frequency range below about 15 kHz, because the measurement calculations for the AVP are based on finite-difference approximations that are valid only when the wavelength of sound exceeds the spacing d between microphones, i.e. according to the relation $kd<1$ where $k=2\pi/\text{wavelength}$.

Subsequently two continuations-in-part (CIPs) were submitted describing the use of arrays of AVPs 2. R. Hickling, 2003, "Method and Apparatus for Acoustic Detection of Buried Objects", patent application to the United States Patent and Trademark Office Ser. No. 10/658,076, Filing Date Sep. 9, 2003.

3. R. Hickling, 2003, "Sound Source Location and Quantification using Arrays of Vector Probes", patent application to the United States Patent and Trademark Office, Ser. No. 10/746,763, Filing Date Dec. 26, 2003.

The technical information contained in these CIPs is hereby incorporated herein by reference. They describe how arrays of AVPs can be used for a variety of applications. They also indicate how modern digital signal processing permits simultaneous measurement at all the AVPs in the array.

Review of Echolocation and Use of Ultrasonics

Echolocation (perceiving objects using acoustic echoes) is a well-known concept, particularly for underwater detection and machine perception. The most advanced form of echolocation in air appears to be that of bats whose remarkable abilities have been described by 4. D. R. Griffin, 1958, "Listening in the Dark, The Acoustic Orientation of Bats and Man", Yale University Press, New Haven.

and by

5. J. A. Simmons, 1997, "Bats and Echolocation", Chapt. 151, 1819–1822, "Encyclopedia of Acoustics", (M. J. Crocker, Ed.) John Wiley and Sons.

Use of echolocation by the blind is discussed by Griffin. A clicking or tapping device is used to generate audible sound pulses and the ears detect the resulting echoes from nearby objects. In general bats use ultrasound which is sound above the frequency range of human hearing. This enables them to detect small objects such as insects and generally to operate at frequencies above background noise, both natural and man-made. The signals emitted by bats have directional characteristics, as described by 6. D. J. Hartley and R. A. Suthers, 1989, "The sound emission pattern of the echolocating bat, *Eptesicus fuscus*", J. Acoust. Soc. Amer. 85, 1348–1351.

A more easily understood version of the data in this paper is presented by

7. J. A. Simmons, 2002, "Directionality of biosonar broadcasts and reception by the ears", Tutorial Lecture, Acoustical Society of America, Pittsburgh, Pa., Jun. 2, 2002.

The horizontal cross-section of the beam of the emitted signals is regular in shape and generally too wide to distinguish individual objects. For example for frequencies around 35 kHz the beam is roughly 100 degrees wide. Obviously bats cannot distinguish individual objects with so wide a beam. Instead they have to depend on their hearing system to achieve the resolution needed for echolocation.

Ultrasound is used in devices, such as range finders in cameras, distance measuring systems and depth gages. Generally the same transducer is both the source and receiver. The transducer emits a pulse and waits to receive the echo before emitting another pulse. Perhaps the most widely known system of this kind is manufactured by the Polaroid Corporation of Wayland, Mass. for range finding by a camera. This has been used extensively in research studies, for example by 8. D. Lee, 1996, "The Map-Building and Exploration Strategies of a Simple Sonar Equipped Mobile Robot" Cambridge University Press.

This book illustrates signal processing methods associated with use of the Polaroid sensor. In addition ultrasonic sensing systems for industry are manufactured by The Ultrasonic Arrays Company of Woodinville, Wash. where the source and receiver are again generally the same transducer.

The use of the same transducer as a source and receiver has disadvantages. There is a time constraint because the transducer has to wait to receive the echo before emitting another signal. Also it can only receive echoes from ahead of the transducer. With the echolocation system of bats, on the other hand, the source and receiver are separate. A bat can emit ultrasonic signals whenever it wants and can hear echoes and other sounds from many directions. In this way it is able to echolocate successfully.

It is not easy for humans, whose dominant sense is vision, to relate to echolocation. Vision operates passively, because objects are perceived only when illuminated by natural or artificial light. Echolocation, on the other hand, is active, objects being perceived when sound emitted by a source operates in conjunction with a receiver. Also there is a major difference between reflected light and reflected sound. Usually light is scattered in all directions from all points on a surface, so that every point on the surface can be seen by the eye. On the other hand, sound is usually backscattered by mirror-like highlights where these highlights are the only parts of a surface that can be perceived at any one time. A complex surface generally will have more highlights and will reveal more of itself. Additional information is obtained when the source/receiver and the reflecting surface are in relative motion, so that the highlights move over the surface. The bat's motion through the air is therefore a major part of it's ability to echolocate. To return a detectable echo, an object must be larger than the wavelength of the incident sound. The strength of an echo is generally determined by the radius of curvature at the location of a highlight on a surface.

Distance to a reflecting object is determined by the round-trip time of flight of an acoustic signal, i.e. the time taken for sound to travel from the source to the object and back to the receiver. Multiplying the time of flight by the speed of sound and dividing by two gives the distance. Two methods have been used to measure time of flight. The most common method uses sound pulses or bursts of sound. Time of flight is the interval of time between the departure of the outgoing pulse from the source and the return of the corresponding echo to the receiver. A feature of the pulse, such as the leading edge or its maximum amplitude, is used as a time marker. This method is used in devices, such as range finders in cameras, and depth gages.

The second, less common method uses frequency modulation. Here the outgoing sound generally consists of a continuous signal with a saw-tooth frequency modulation, whose frequency sweep is related to the distance between the source and the reflecting object. Because the source transmits a continuous signal, a separate receiver is required. The echoes have a corresponding saw-tooth frequency modulation, delayed relative to the outgoing signal by the round-trip travel of the sound. The received signal is then heterodyned or mixed with the outgoing signal. This generates a trace of pressure amplitude versus time, or time response (based on frequency differences), which determines the distances of various reflecting surfaces from the source/receiver. The method has been is described by 9. R. C. Heyser, "Acoustical Measurements by Time Delay Spectrometry" U.S. Pat. No. 4,279,019, July, 1981.

A similar method was developed as an aid to the blind by

10. L. Kay, 2000, "Auditory perception of objects by blind persons, using a bioacoustic high resolution air sonar", Journ. Acoust. Soc. Amer., 107(6), 3266–3276.

The device has earphones and is worn on the head.

Bats use frequency-modulated pulses, the frequency generally decreasing from the beginning to the end of the pulse. Distance to an object is determined by the time of flight of the pulses. Frequency modulation of the echoes compared to the frequency modulation of the outgoing pulsed signals provides additional information. Echoes using frequency modulated pulses were studied by 11. R. Hickling and R. W. Means, 1968, "Scattering of Frequency-Modulated Pulses by Spherical Elastic Shells in Water," Journ Acoust. Soc. Amer., 44, 5, 1246–1252.

Incident sound can generate a vibrational response in an object, as shown, for example, by 12. R. Hickling, 1962, "Analysis of echoes from a solid elastic sphere in water", Journ. Acoust. Soc. Amer., 34, 1582–1592.

This gives the echo a quality determined by the internal structure of the reflecting object and is probably used by bats. The effect is relatively weak for solid objects in air, compared to solid objects in water.

Bat Detectors

The ultrasonic signals of bats can be changed to audible frequencies by using an electronic process called heterodyning or mixing. This is a standard procedure in radio technology, as described for example in 13. D. B. Rutledge, 1999, "The Electronics of Radio", Cambridge University Press.

Griffin was the first to apply heterodyning to bat signals to make them audible to the human ear and the method has been used extensively since then.

OBJECTS AND ADVANTAGES

What is needed and desired is an echolocation instrument for robot guidance and assisting the blind that (a) simulates the capabilities of bats by combining an AVP with a source of pulsed ultrasound.

(b) heterodynes ultrasonic measurements by the AVP down to lower frequencies so that the measurement calculations of the AVP can be applied to determine sound-intensity vectors accurately and hence the direction of echoes.

(c) locates the position of echo highlights on the surfaces of objects by combining the time-of-flight of the ultrasonic pulses and the direction of travel of the echoes.

(d) uses the positions of highlights to locate and identify objects.

(e) significantly increases highlight information when the echolocation instrument is in motion.

(f) determines additional information from the Doppler shift of the echo highlights.

SUMMARY OF THE INVENTION

The present invention includes and utilizes an echolocation system for robot guidance and assisting the blind. It is modeled on the echolocation abilities of bats. It combines into one instrument a source of pulsed ultrasound and a recently developed acoustic vector probe (AVP). This instrument is used in conjunction with a data acquisition system, a signal processor and an output device. The source emits pulses of ultrasound over a beam width of about 100 degrees and the AVP detects backscattered pulses from a discrete distribution of acoustic highlights on surrounding objects. The ultrasonic sound pressures of the backscattered pulses is measured at each of the four microphones of the AVP, which are then heterodyned in the digital signal processor down to lower frequencies so that the processor can make an accurate determination of the sound-intensity vector for each pulse. The sound-intensity vector points in the direction of the highlight from which a pulse originates while the time of flight of the pulse determines the distance of the highlight from the echolocation instrument. By combining distance and direction, the position of the highlight is located in space. At any instant in time the distribution of echo highlights provides an instantaneous impression of surrounding objects. As the echolocation instrument moves relative to the surrounding objects, a sequence of such impressions can be stored in processor memory and assembled to provide a more complete representation of the surroundings. Also Doppler shifting can provide additional information about the movement of the highlights.

DESCRIPTION OF THE PREFERRED EMBODIMENT

Figure 1:
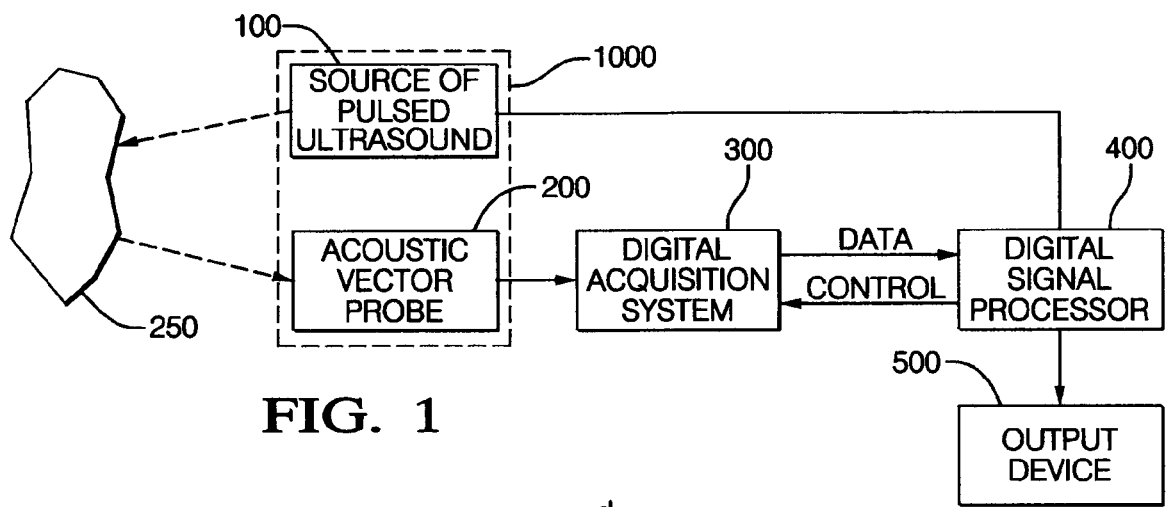
FIG. 1 is a block diagram of an echolocating system with a source of pulsed ultrasound operating in conjunction with an acoustic vector probe (AVP).

FIG. 1 is a block diagram showing the different components of the invention. A source of pulsed ultrasound 100 is combined with an acoustic vector probe (AVP) 200 to form an echolocation instrument 1000 linked to a data acquisition system 300, a digital signal processor 400 and a display unit 500. The processor controls the source 100 and the data acquisition system 300. Backscattered echoes to the pulses from the source 100 are returned by an object 250 to the probe 200.

Figure 2:
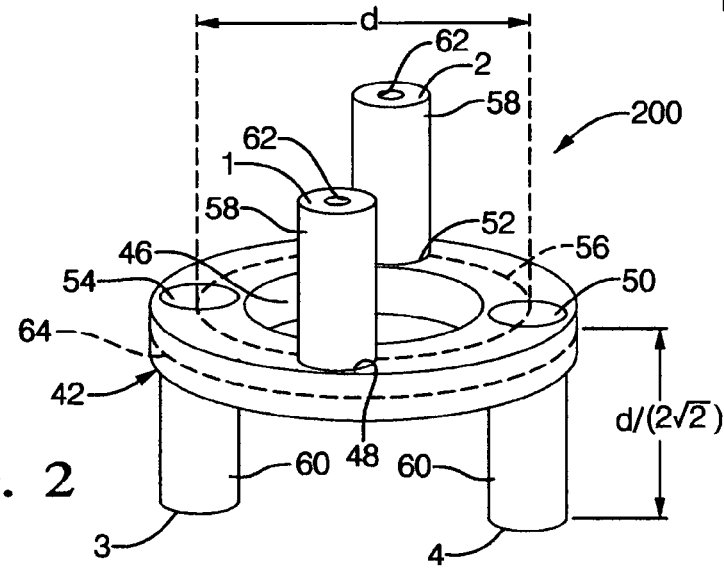
FIG. 2 is a perspective view of an AVP forming a part of the invention.
Figure 3:
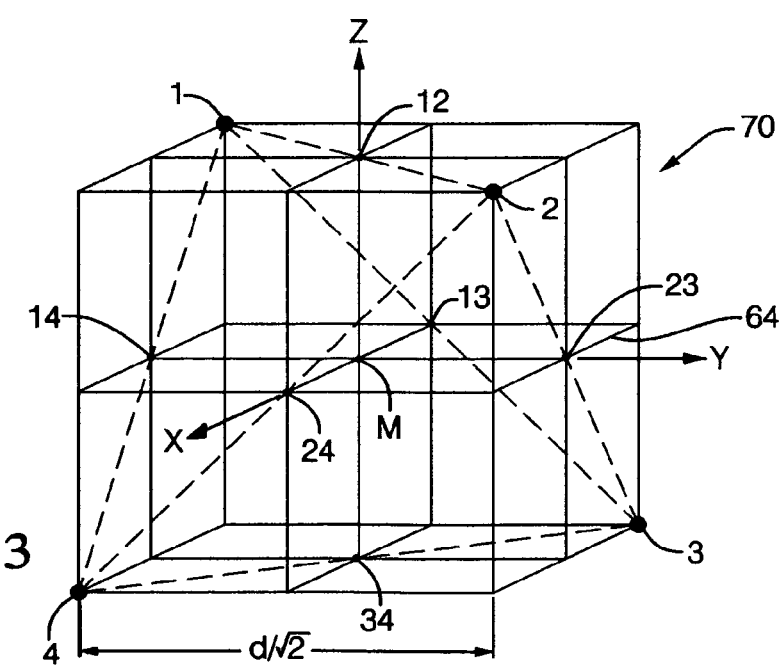
FIG. 3 is a cubic lattice diagram showing the geometry of the tetrahedral arrangement of microphones in the AVP and the relation of the microphones to the system of Cartesian coordinates used in determining the sound-intensity vector at the origin M and the directions of the highlights.

FIGS. 2 and 3 illustrate the structure and function of the AVP 200 in determining the sound-intensity vector. AVP 200 includes a fixture 42 being an annular member formed as a ring with a central opening 46. Protruding from the ring are four support tubes for the microphones parallel to the axis of the ring, two on one side of the ring pointing in one direction and two on the reverse side pointing in the opposite direction. These tubes are spaced around the ring at ninety degree intervals at openings in the ring at 48, 50, 52 and 54, and centered on an annular centerline 56 having a diameter d. The pair of tubes 58 on one side of the ring is attached to the ring coincident with diametrically opposite openings 48 and 50, and the pair of tubes 60 on the reverse side of the ring is attached to the ring coincident with diametrically opposite openings 52 and 54. The outer ends of the support tubes 58, 60 are each a distance $d/(2\sqrt{2})$ from the central base plane 64 of the ring and a distance $d/\sqrt{2}$ from each other. Within the ends of the two support tubes 58 are located microphones 1, 2 and within the ends of the support tubes 60 are located microphones 3 and 4. Microphones 1 through 4 are located at the vertices of an imaginary regular tetrahedron. The advantages of the structure in FIG. 2 are: (a) the microphones are symmetric on the two opposite sides of the base ring so that they detect sound equally from both directions; (b) the measurement point M is well defined; (c) the procedure for normalizing and calibrating can be applied easily. Since the dimensions of the probe are required to be less than the wavelengths being measured, the effect of diffraction will be insignificant.

In FIG. 3, the geometric placement of the four microphones in the tetrahedral arrangement is shown inserted within an imaginary cubic lattice 70 having 6 faces with midpoints 12, 13, 14, 23, 24, 34. Lines through the midpoints of the opposite faces of the lattice pass through an origin M, which is the measurement point, and form X, Y and Z axes of the cubic lattice 64. The lines between the microphones form diagonals (not shown) across the faces of the cubic lattice, which also represent the edges of the regular tetrahedron and pass through the midpoints 12, 13, 14, 23, 24 and 34 with a length of the dimension d. These lines form hypotenuse lines for the respective faces of the cubic lattice 64 so that the edges of the sides of the lattice have dimension $d/\sqrt{2}$.

At the microphones 1, 2, 3 and 4 at the vertices of the regular tetrahedron in FIG. 2, the corresponding sound pressures p1, p2, p3 and p4 are measured and digitized. In order to determine the sound-intensity vector accurately, the AVP 200 has to satisfy the condition $$kd/2 < 1 \tag{1}$$

where $k = 2\pi/\text{wavelength}$. Because of their relatively short wavelength, the ultrasonic pulses emitted by the source 100 do not satisfy this condition and it is necessary to apply a heterodyning procedure to the measured sound pressures to convert them from ultrasound to sound in the audible frequency range satisfying Equation (1). The discrete Fourier transforms (DFTs) of the heterodyned sound pressures are then computed, normalized and calibrated using the transfer-function procedure described by Hickling in Ref. 1, providing the modified transforms Fp1(f), Fp2(f), Fp3(f) and Fp4(f) at the discrete points $f = f_i$, $i = 1, n$. For simplicity, the frequency dependence (f) will be dropped. Finite difference approximations (derived from Taylor series expansions) are then used to obtain the DFTs of the sound pressures at the six midpoints of the edges of the regular tetrahedron at 12, 13, 14, 23, 24 and 34 in FIG. 3, giving respectively $$Fp12=(Fp1+Fp2)/2 \ Fp13=(Fp1+Fp3)/2 \ Fp14=(Fp1+Fp4)/2$$

$$Fp23=(Fp2+Fp3)/2 \ Fp24=(Fp2+Fp4)/2 \ Fp34=(Fp3+Fp4)/2. \quad (2)$$

These approximations are accurate to the second order, i.e. order $(kd)^2/4$, provided Equation (1) is satisfied.

The components of the sound-intensity vector at the measurement point M are determined from the sound pressure DFTs in Equation (1), using the cross-spectral formulation for sound intensity described by Hickling (Ref 1). The components are $$FIX=-Im \ CS[Fp24, Fp13]/(\rho 2\pi f(d/\sqrt{2}))$$

$$FIY=-Im \ CS[Fp23, Fp14]/(\rho 2\pi f(d/\sqrt{2}))$$

$$FIZ=-Im \ CS[Fp12, Fp34]/(\rho 2\pi f(d/\sqrt{2})) \quad (3)$$

where Im is the imaginary part and CS is the cross spectrum of the sound pressures at the midpoints of the opposite edges of the imaginary regular tetrahedron in FIG. 3, and $\rho$ is the density of the fluid medium, which is approximately 1.3 kg/m³ for air. The amplitude of the sound-intensity vector is given by $$FIA=\sqrt{[FIX^2+FIY^2+FIZ^2]} \quad (4)$$

Sound intensity is expressed in SI units of watts per meter squared per second.

Figure 4:
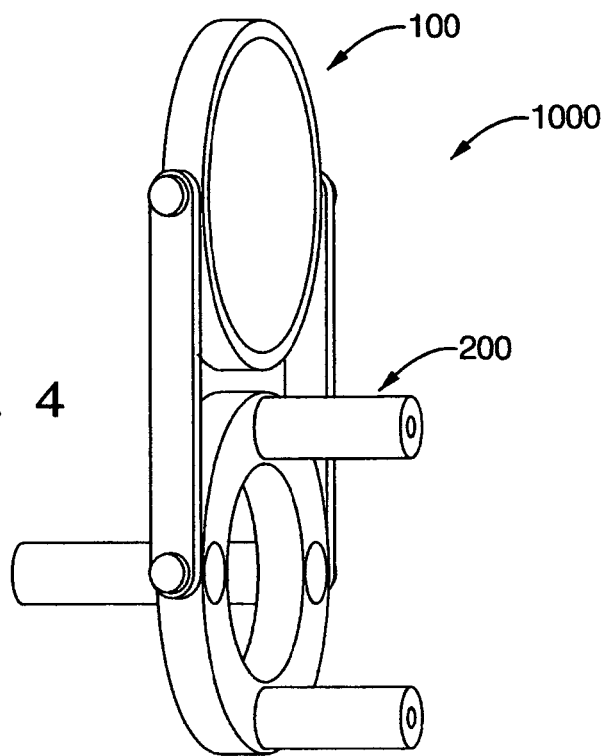
FIG. 4 is a pictorial representation of an echolocating instrument consisting of an AVP combined with a source of pulsed ultrasound.

FIG. 4 shows a source of pulsed ultrasound 100 is combined with an AVP 200 to form an echolocation instrument 1000. Typically the source and the AVP have similar dimensions. The axis of the source is in the same direction of the z-axis in FIG. 3. If necessary the echolocation instrument 1000 can be rotated about a vertical or other axis to simulate the movement of a bat's head.

Figure 5:
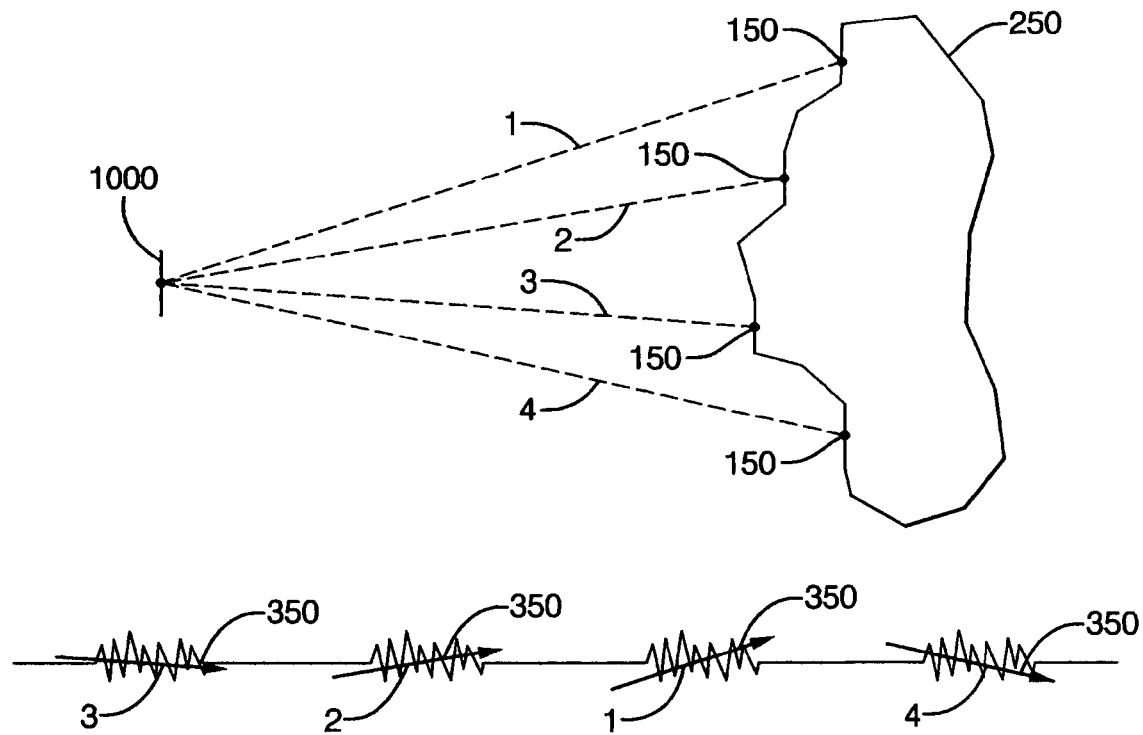
FIG. 5 illustrates how highlights on the surface of an object return backscattered pulses to the AVP and how the AVP determines the direction of the highlight from which each pulse originates.

FIG. 5 illustrates how the backscattered pulses are returned to the echolocation instrument 1000 from the echo highlights 150 on the surface of an object 250 at locations 1, 2, 3 and 4. Backscattering occurs where a part of the surface of the object is perpendicular to the direction from the echolocation instrument. In FIG. 5 backscattered pulses from the highlights at 1, 2, 3 and 4 are received by the AVP in a sequence shown in the lower part of the figure, according to the distance of the highlight from the AVP. The AVP then determines the sound-intensity vector for each backscattered pulse which indicates the direction 350 of the highlight originating the pulse. Combining this directional information with the round-trip time of flight of the pulse determines where a highlight occurs on the surface of the object. The distribution of highlights at any one instant provides a first impression that can help to locate and possibly identify an object. When the echolocation instrument 1000 moves it can track the corresponding movement of highlight distributions over surrounding objects. The sequence of distributions can be stored in the memory of the digital signal processor 400 and can be used to obtain a more complete representation of the objects. Additional information can be obtained using the Doppler shift of the highlights.

More than one echolocation instrument can be used for any application. Among possible applications is the detection of obstacles in the blind spots of moving vehicles.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

I claim:

1. An apparatus for robot guidance and for assisting the blind, based on the echolocation abilities of bats, comprising:
    a source of pulsed ultrasound;
    an acoustic vector probe;
    said vector probe including four microphones supported by a frame at vertices of a regular tetrahedron;
    two of said microphones facing a same of first direction and another two of said microphones facing a same opposite direction;
    said probe connected to a data acquisition system;
    said data-acquisition system providing input to a digital signal processor;
    said processor controlling the source of pulsed ultrasound; and
    said processor connected to a device for outputting data.

2. The apparatus as defined in claim 1 wherein said source of pulsed ultrasound and said acoustic vector probe are combined into an echolocation instrument, said vector probe and said source of pulsed ultrasound structurally connected together and pointing in the same direction.

3. The apparatus as defined in claim 2 wherein said source of pulsed ultrasound has a beam approximately 100 degrees wide and wherein said acoustic vector probe detects backscattered pulses from a discrete distribution of acoustic highlights on surrounding objects.

4. The apparatus as defined in claim 2 wherein the sound pressures of said backscattered pulses measured by the four microphones of said acoustic vector probe are heterodyned to lower frequencies by said digital signal processor to enable said processor to make an accurate determination of the sound-intensity vector for each of said backscattered pulses.

5. The apparatus as defined in claim 4 wherein said sound-intensity vector for each of said backscattered pulses determines the directions of the acoustic highlights from which said backscattered pulses originate.

* * * * *